(12) United States Patent
Knox

(10) Patent No.: US 6,956,310 B1
(45) Date of Patent: Oct. 18, 2005

(54) MOTOR BEARING FOR SUBMERSIBLE MOTORS

(75) Inventor: Dick Lee Knox, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 1028 days.

(21) Appl. No.: 09/656,683

(22) Filed: Sep. 7, 2000

(51) Int. Cl.$^7$ .............................................. H02K 5/16
(52) U.S. Cl. ............................ 310/90; 310/87; 384/37; 384/218
(58) Field of Search .............................. 310/90, 87, 91; 384/37, 215, 218, 219, 119

(56) References Cited

U.S. PATENT DOCUMENTS

| | | | |
|---|---|---|---|
| 3,485,540 A * | 12/1969 | Nogle ............................ 308/9 |
| 4,119,874 A | 10/1978 | Beavers et al. ............... 310/90 |
| 4,323,801 A | 4/1982 | Weghaupt et al. ............ 310/52 |
| 4,435,661 A | 3/1984 | Witten .......................... 310/90 |
| 4,513,215 A | 4/1985 | Del Serra ..................... 310/90 |
| 4,521,708 A | 6/1985 | Vandevier ..................... 310/87 |
| 4,890,937 A * | 1/1990 | Balsells ........................ 384/16 |
| 5,189,328 A | 2/1993 | Knox ........................... 310/90 |
| 5,436,515 A * | 7/1995 | Ide ............................... 310/90 |
| 5,719,454 A | 2/1998 | Halsey et al. ................ 310/90 |
| 6,091,175 A * | 7/2000 | Kinsinger ..................... 310/90 |

* cited by examiner

Primary Examiner—Dang D. Le
(74) Attorney, Agent, or Firm—Bracewell & Giuliani LLP

(57) ABSTRACT

A submersible pump motor has rotor sections spaced apart from each other with bearings located between. The bearings support the shaft of the rotor within a stator. The bearing is stationary and has a cavity in its outer periphery. A metallic coiled member is positioned along the circumference of the bearing, and rests in the cavity on the outside diameter of the bearing. The coiled member engages the bearing and the inner wall of the stator to prevent rotation of the bearing.

14 Claims, 2 Drawing Sheets

MOTOR BEARING FOR SUBMERSIBLE MOTORS

BACKGROUND OF THE INVENTION

1. Field of the Invention

This invention relates in general to submersible pump motors, and in particular to a bearing assembly which resists rotation. The bearing assembly supports the shaft in the motor.

2. Description of the Prior Art

A submersible pump is a centrifugal pump having a submersible motor that rotates the shaft to drive the pump. The motors for high volume oil and water production may be from six to sixty feet in length and be rated at several hundred horsepower. Each motor has a stator secured within a tubular housing. The stator is made up of thin disks, called laminations, that are magnetic and insulated from each other by coatings. Windings extend through the laminations to the stator.

A rotor secured to a shaft rotates within the stator. Because of the long length, the rotor is made up of a number of rotor sections. Each rotor section comprises a large number of flat metal disks, called laminations, that are secured by copper rods. The disks are insulated from each other by coatings. The rotor sections are spaced apart from each other, and a bearing assembly is located between each rotor section to maintain the shaft in axial alignment. The rotor sections are keyed to the shaft for rotation with the shaft, but are axially movable with respect to the shaft.

Each bearing assembly includes a sleeve keyed to the shaft for rotation. A bearing body fits slidingly on the sleeve. An elastomeric ring encircles the bearing body, acting as a bearing member. The motor is filled with oil, causing the elastomeric ring to expand and frictionally engage the inner wall of the stator. This engagement prevents the bearing body from rotating and supports the shaft in alignment.

As the motor heats up to operating temperature, the bearing body will expand slightly outward. Also, the shaft will likely grow longitudinally, causing the bearing body to move longitudinally with respect to the stator. Therefore, the bearing body must be precisely dimensioned so that it does not engage the stator wall so tightly as to create excessive thrust loads on thrust washers located above and below the bearing assembly. Also, the elastomer material used to construct the bearing member must be carefully designed so that the swelling due to oil in the motor is the correct amount.

SUMMARY OF THE INVENTION

The present invention involves a coiled member placed in a cavity formed in the outside diameter of the bearing body. The purpose is to maintain contact between the bearing body and the stator inner wall, which prevents rotation of the bearing body and stabilizes the shaft. In the preferred embodiment, the coiled member is metallic. This broadens the operating uses of the bearing member since the bearing member will not be restricted by variability and temperature limitations of other materials, nor by the swelling limitations due to submergence in oil. The coiled member may be comprised of a continuous coiled member, connected end-to-end to form a single ring. Alternatively, the coiled member may be comprised of more than one coiled member segment. These multiple coiled member segments can be connected end-to-end with straight wire sections between them to form a single ring that sits in the cavity encircling the entire bearing body.

DESCRIPTION OF THE PREFERRED EMBODIMENT

Figure 1:
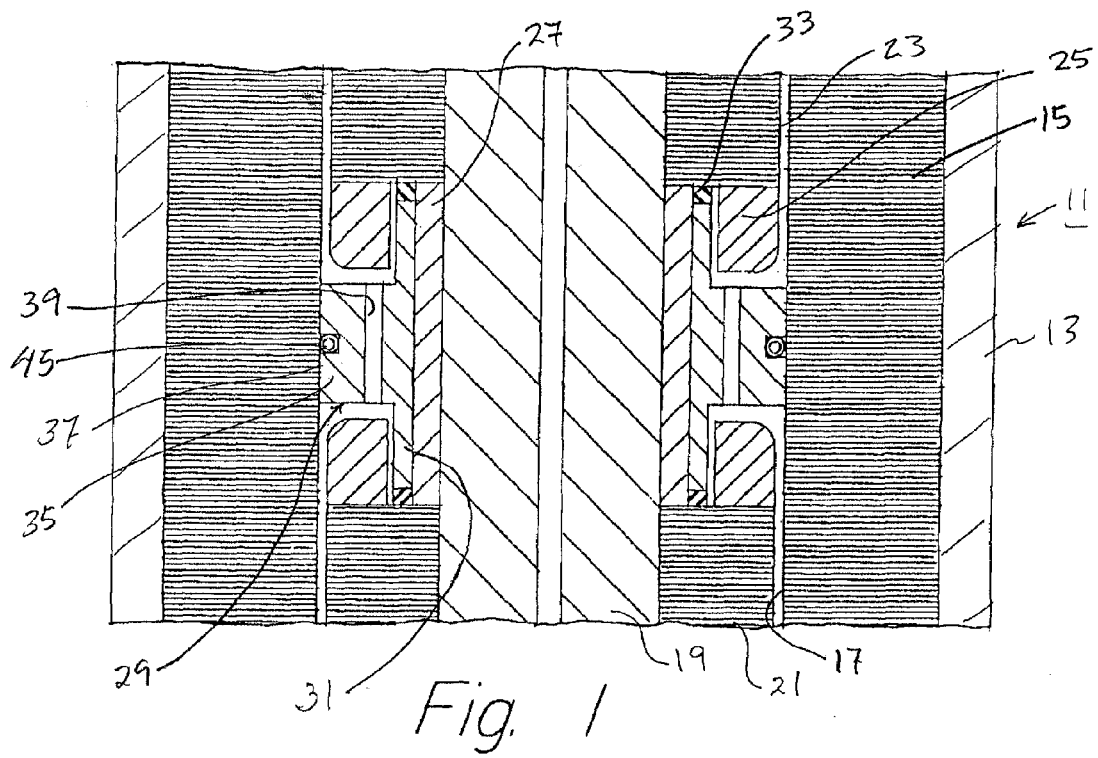
FIG. 1 is a partial, vertical sectional view of an electrical motor having a bearing assembly constructed in accordance with this invention.

Referring to FIG. 1, motor 11 includes a cylindrical housing 13. A stator 15 is rigidly mounted within the housing 13. The stator 15 is made up of a large number of flat magnetic disks, called laminations, having slots through which wires (not shown) are wound in a conventional manner. All the disks of the stator 15 are of magnetic steel. The disks of the stator 15 may be insulated from each other by coatings in a conventional manner. The stator 15 has a cylindrical inner wall 17 that is of uniform constant diameter.

A rotor is rotatably mounted within the inner wall 17 of the stator 15. The rotor is comprised of a shaft 19 and a large number of metallic disks or laminations. The laminations are divided into identical rotor sections 21 approximately fifteen inches in length. A portion of two rotor sections 21 is shown in FIG. 1. Each rotor section 21 has an outer wall 23 that is closely spaced to the inner wall 17 of the stator 15. Each rotor section 21 is secured by copper rods (not shown), with copper end rings 25 on both sides. The ends of the copper rods are brazed or mechanically welded to the end rings 25 to hold the laminations in each rotor section 21 together.

Each rotor section 21 is secured by a key (not shown) to the shaft 19 for rotation therewith. The sections of the rotor 21 are not individually axially locked to the shaft 19. However, the lowermost section of rotor 21 at the end of the shaft 19 is axially locked to support the sections of the rotor 21 with respect to the shaft 19. Also, the uppermost section of the rotor 21 will be axially locked to the shaft 19.

A bearing assembly is located between each of the rotor sections 21. The bearing assembly includes a sleeve 27 that is secured to shaft 19 for rotation therewith by means of a key (not shown). Sleeve 27 is preferably a bronze cylinder and is not axially locked to shaft 19. The upper edge or circular rim of sleeve 27 contacts the lowermost lamination of the section of rotor 21 directly above, and the lower edge of sleeve 27 contacts the uppermost lamination of the section of rotor 21 directly below. Therefore, the sleeve 27 supports the weight of the rotor sections 21 above and transmits any downward force on rotor sections 21 above to the next lower rotor section 21.

A bearing body 29 has a hub or inner portion 31 that is located within the inner bore of each end ring 25, with a clearance between the end ring 25 inner diameter and the hub 31 outer diameter. Hub 31 is cylindrical and has less length than sleeve 27. Hub 27 is preferably of steel, and may be magnetic.

A thrust washer 33 is located around the outer diameter of sleeve 27 and between the section of rotor 21 directly above and the upper edge of hub 31. A similar thrust washer 33 is located between the lower edge of hub 31 and the rotor section 21 directly below. Thrust washers 33 are preferably of a non-metallic material, such as glass reinforced phenolic material. The distance from the lower side of the lower thrust washer 33 to the upperside of the upper thrust washer 33 is about 1/32 inch less than the height of sleeve 27. This prevents the thrust washers 33 from supporting the weight of the rotor sections 21 located above.

Bearing body 29 has a flange or outer portion 35 that extends radially outward from hub 31. Outer portion 35 has a cylindrical periphery 37 that is spaced inward from the inner wall 17 of stator 15 by a clearance of about 0.003 to 0.005 inch on the diameter. The longitudinal thickness or height of the outer portion 35 is less than the distance between the two adjacent end rings 25. A plurality of passages 39 extend through the outer portion 35 for communicating oil contained within the housing 13. Bearing body 29 is normally of a metallic material, preferably nitralloy.

Figure 2:
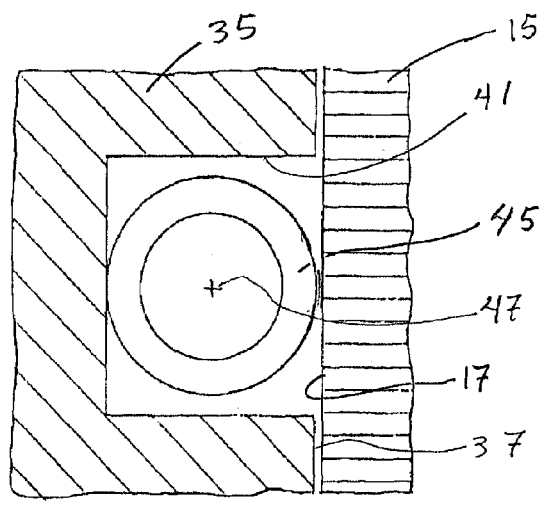
FIG. 2 is an enlarged sectional view of the bearing member in the bearing cavity of FIG. 1.

Referring to FIG. 2, the cylindrical periphery 37 of the bearing body 29 outer portion 35 has an annular groove or cavity 41 extending circumferentially around bearing body 29 perpendicular to the axis of shaft 19. Cavity 41 is preferably rectangular in cross-section. A coiled member 45 is recessed within the cavity 41. The space occupied by the coiled member 45 forms a toroid. The coiled member 45 is metallic, preferably of spring steel. The coiled member 45 is sized to fit inside of the cavity 41 and maintain contact with both bearing body 29 and the inside wall 17 of the stator 15, thus the coils of coiled member 45 have a diameter greater than the radial extent of cavity 41. The coil member 45 may have a circular cross-section (as shown) or perhaps a square, rectangular, triangular, or other suitable cross-section. A centerline 47 extends through the coils of coiled member 45. The centerline 47 is a circumferential line with a radius relative to the axis of shaft 19. The radius of the centerline 47 is less than the radius of the cylindrical periphery 37 of the outer portion 35 of the bearing 29. In the undeflected condition, the coiled member 45 has a diameter that is greater than the radial depth of the cavity 41 so that an outer portion protrudes past the cylindrical periphery 37 of the bearing body 29. The diameter of the coiled member 45 is selected so that an outer portion of the coiled member 29 will contact inner wall 17 of stator 15 and deflect. The stiffness of the coiled member 45 is selected so that coiled member 45 will grip inner wall 17 of stator 15 with sufficient force to prevent bearing 29 from spinning with the shaft 19.

Figure 3:
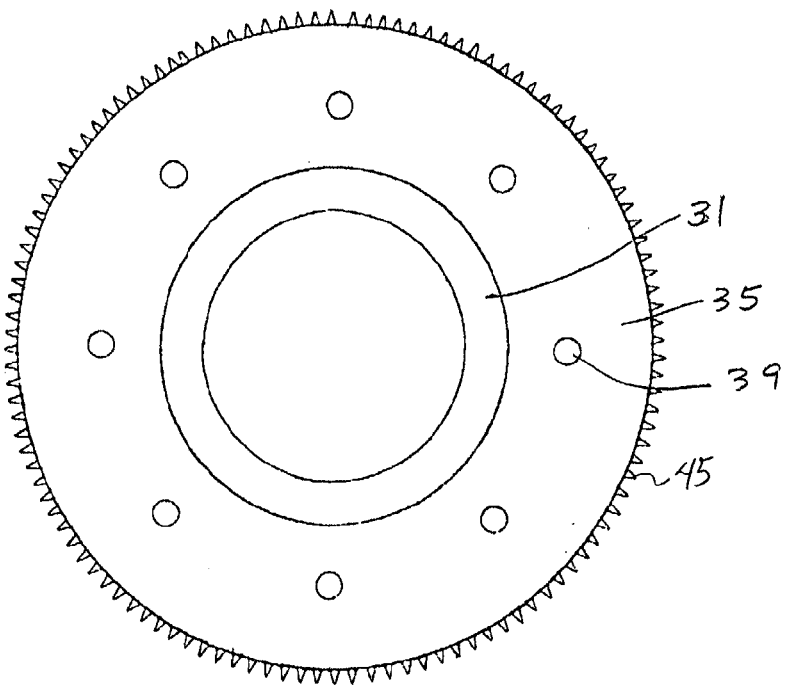
FIG. 3 is a cross sectional view of the rotor and bearing member demonstrating the fall bearing member adapted to encircle the entire bearing body.
Figure 4:
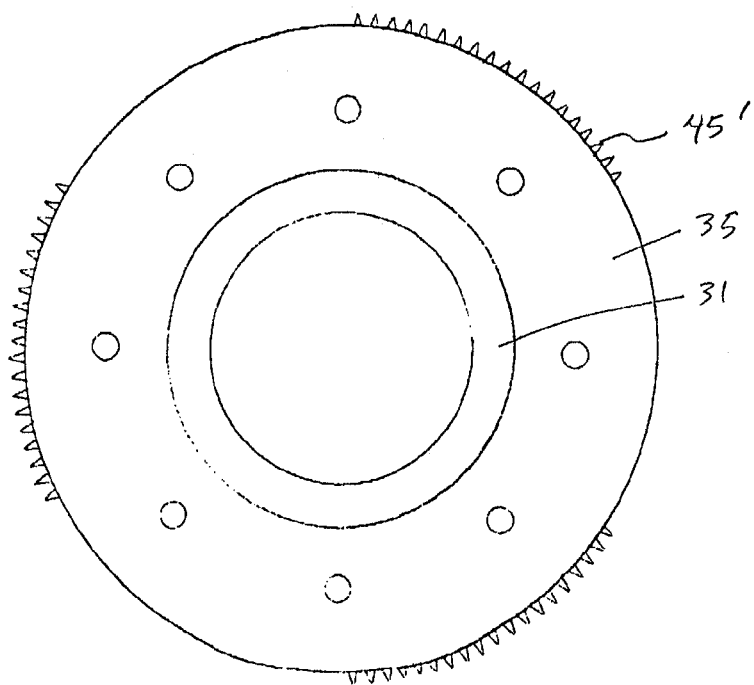
FIG. 4 is a cross sectional view of the rotor and bearing member demonstrating the partial bearing member segments adapted to contact the bearing body only partially.

Referring to FIG. 3, the coiled member 45 may be a continuous spring element, stretched around the circumference of the bearing cavity 41 with its ends connected together (as shown). Alternatively, in FIG. 4, the coiled member 45' may be non-continuous about the circumference of the bearing cavity 41. A plurality of coiled member segments 45' may be spaced apart from each other around the circumference of cavity 41. One embodiment employs three coil element segments 45' spaced equally apart (as shown) to provide three points of support at 120 degrees spacing around the inside diameter 37 of stator 15. Coiled member segments 45' can be connected end-to-end with straight wire sections between them to form a single ring.

During assembly, coiled member 45 is inserted into the bearing body cavity 41. The sleeve 27 and bearing body 29 are assembled upon the shaft 19 between rotor sections 21. Then the rotor is inserted into the stator 15, with coiled member 45 radially deflecting as it slides past the laminations of stator 15. Housing 13 is filled with oil, which does not cause swelling of coiled member 45. The coiled member 45 continues to be engaged in contact with the bearing body cavity 41 and stator inner wall 17. In operation, sleeve 27 will rotate with the hub 31. The frictional engagement due to deflection of coiled member 45 prevents bearing body 29 from spinning with shaft 19. Heat will cause the rotor sections 21 to expand longitudinally, while stator 15 is prevented from the same axial expansion. The resilient nature of the coiled member 45 allows some axial movement of rotor sections 21 relative to stator 15 to accommodate this expansion.

The invention has significant advantages. The coiled member arrangement allows easy insertion of the rotor into the stator 15 yet stops the bearing body 29 from spinning once the motor begins operation. The metallic coiled member 45 has advantages over elastomeric T-rings used in other systems in that it is not limited by he temperature limitations and variability of the elastomer. The coiled member 45 centers the bearing body 29 within the stator 15 bore and provides good radial support.

While this invention has been shown in only two of its forms, it should be apparent to those skilled in the art that it is not so limited but is susceptible to various changes without departing from the scope of the invention.

I claim:

1. In an elongated electric motor for a submersible pump having a cylindrical housing, a stator mounted in the housing for producing a magnetic field when supplied with electrical power, a rotatable shaft installed within the stator, a rotor comprised of spaced apart rotor sections mounted to the shaft, an improved bearing assembly mounted between two of the adjacent rotor sections for supporting the shaft, comprising in combination:
    a stationary bearing body that rotatably receives the shaft, the bearing body having a cylindrical outer periphery with a cavity extending to the outer periphery of the bearing body; and
    a coiled member contained in the cavity, having an outer portion that frictionally engages an inner wall of the stator, preventing rotation of the bearing body and stabilizing the shaft.

2. The motor according to claim 1, wherein the coiled member is made of a metallic material.

3. The motor according to claim 1, wherein the coiled member is a continuous coiled element extending entirely around the outer periphery of the bearing body.

4. The motor according to claim 1, wherein the coiled member comprises a plurality of coiled member segments that are spaced apart from each other around the outer periphery of the bearing body.

5. The motor according to claim 1, wherein the coiled member is circular in cross-section and has a cross-sectional diameter greater than a radial depth of the cavity.

6. The motor according to claim 1, wherein the cavity extends circumferentially along the outer periphery of the bearing body, and the coiled member has a centerline that extends circumferentially around the bearing body.

7. The motor according to claim 1, wherein the coiled member has a radial dimension from an inner portion to the outer portion that is greater than a radial dimension from a base of the cavity to the inner wall of the stator while the coiled member is in an undeflected state.

8. An elongated electric motor, comprising in combination:
    a cylindrical housing;
    a stator mounted in the housing for producing a rotating field when supplied with electrical power;
    a rotatable shaft installed within the stator;
    a rotor comprised of spaced-apart rotor sections mounted on the shaft;
    a stationary bearing body that rotatably receives the shaft and is located between two of the rotor sections, the bearing body having a cylindrical outer periphery provided with a cavity extending circumferentially along the outer periphery of the bearing body; and a metallic coiled member contained in the cavity, the coiled member being circular in cross-section with a cross-sectional diameter greater than a radial depth of the cavity, with an outer portion that extends circumferentially along the outer periphery of the bearing body and frictionally engages an inner wall of the stator, preventing rotation of the bearing body and stabilizing the shaft.

9. The motor according to claim 8, wherein the coiled member is a continuous coiled element extending entirely around the outer periphery of the bearing body.

10. The motor according to claim 8, wherein the coiled member comprises a plurality of coiled member segments that are spaced apart from each other around the outer periphery of the bearing body.

11. The motor according to claim 8, wherein the cross-sectional diameter of the coiled member while undeflected is greater than the radial dimension from a base of the cavity to the stator inner wall.

12. An improved bearing assembly for mounting between adjacent rotor sections of an elongated electric motor having a stator, a rotatable shaft installed within the stator, and a rotor comprised of spaced apart rotor sections mounted to the shaft, the bearing assembly comprising in combination:

a stationary bearing body adapted to rotatably receive the shaft, the bearing body having a cylindrical outer periphery with a circumferentially extending cavity therein, the cavity having an outward facing base; and a metallic coiled member contained in the cavity, the coiled member having a circular cross-section with a cross-sectional diameter greater than a radial dimension of the cavity, having an inner portion in contact with the base and an outer portion protruding past the outer periphery for contact with the stator.

13. The bearing assembly according to claim 12, wherein the coiled member is a continuous coiled element extending entirely around the outer periphery of the bearing body.

14. The bearing assembly according to claim 12, wherein the coiled member comprises a plurality of coiled member segments that are spaced apart from each other around the outer periphery of the bearing body.

* * * * *